(12) United States Patent
Kazahaya (10) Patent No.: US 8,917,461 B2
(45) Date of Patent: Dec. 23, 2014

(54) OPTICAL DEVICE AND OPTICAL INSTRUMENT

(71) Applicant: Nikon Corporation, Tokyo (JP)

(72) Inventor: Satoshi Kazahaya, Yokohama (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 13/781,157

(22) Filed: Feb. 28, 2013

(65) Prior Publication Data

US 2013/0176636 A1 Jul. 11, 2013

Related U.S. Application Data

(63) Continuation of application No. 12/835,993, filed on Jul. 14, 2010, now abandoned.

(30) Foreign Application Priority Data

Jul. 17, 2009 (JP) ................................ 2009-168905

(51) Int. Cl.
*G02B 7/02* (2006.01)
*G02B 7/08* (2006.01)

(52) U.S. Cl.
CPC ... *G02B 7/02* (2013.01); *G02B 7/08* (2013.01)
USPC ......................................... 359/819; 359/822

(58) Field of Classification Search
USPC .................................. 359/819, 822–824, 830
See application file for complete search history.

(56) References Cited

FOREIGN PATENT DOCUMENTS

| JP | U-61-114412 | 7/1986 |
|---|---|---|
| JP | A-2000-66076 | 3/2000 |
| JP | A-2004-109710 | 4/2004 |
| JP | A-2006-58582 | 3/2006 |
| JP | A-2006-337470 | 12/2006 |
| JP | A-2007-183669 | 7/2007 |
| JP | A-2007-310067 | 11/2007 |
| JP | A-2008-180762 | 8/2008 |

OTHER PUBLICATIONS

Translation of Sep. 27, 2011 Office Action issued in Japanese Patent Application No. 2009-168905.
Aug. 31, 2012 Office Action issued in U.S. Appl. No. 12/835,993.

*Primary Examiner* — Mahidere Sahle
(74) *Attorney, Agent, or Firm* — Oliff PLC (57) ABSTRACT

An optical device comprising: an elastic body provided between a first frame and a second frame; a position determining portion provided to sandwich, with the elastic body, the first frame, and can determine a position of the first frame towards the elastic body; a fixing portion provided to sandwich, with the position determining portion, the first frame, and can fix the first frame to the position determining portion; and an energizing member energizing the first frame in a direction crossing a position determining direction of the first frame and a fixing direction of the first frame.

9 Claims, 6 Drawing Sheets

OPTICAL DEVICE AND OPTICAL INSTRUMENT

This is a Continuation of application Ser. No. 12/835,993 filed Jul. 14, 2010, which claims priority under 35 U.S.C. §119 to Japanese Patent Application No. 2009-168905 filed on Jul. 17, 2009. The content of the application is incorporated herein by reference in its entirety.

BACKGROUND OF THE INVENTION

1. Field of the Invention

The present invention relates to an optical device and an optical instrument.

2. Description of the Related art

Hitherto, as a method for adjusting the position of the optical axis of a lens provided in a lens barrel, a method to change the position in the radial direction of a lens holding frame by advancing or withdrawing in the radial direction of the lens a plurality of adjustment screws contacting the outer peripheral face of the lens holding frame has been known (for example, refer to Japanese Unexamined Patent Publication No. 2004-109710)

SUMMARY OF THE INVENTION

The problem to be solved by the present invention is to provide an optical device and optical instrument which can provide excellent optical characteristics.

The present invention solves the above problem by the following means.

According to the first aspect of the invention, there is provided an optical device comprising: a first holding frame which holds an optical system; a second holding frame which supports the first holding frame; an elastic body having elasticity, and which is provided between the first holding frame and the second holding frame when viewed from a direction crossing an optical axis of the optical system; a position determining portion which is provided so as to sandwich, with the elastic body, the first holding frame when viewed from the direction crossing the optical axis, and which is capable of determining a position of the first holding frame towards the elastic body so as to give rise to an elastic force at the elastic body; a fixing portion which is provided so as to sandwich, with the position determining portion, the first holding frame when viewed from the direction crossing the optical axis, and which is capable of fixing the first holding frame to the position determining portion so as to fix the first holding frame; and an energizing member which energizes the first holding frame in a direction crossing a position determining direction of the first holding frame by the position determining portion and a fixing direction of the first holding frame by the fixing portion.

The optical device may further comprise: an energizing force regulating portion which regulates an energizing force of the energizing member, provided so as to sandwich, with the first holding frame, the energizing member, in a direction crossing a position determining direction of the first holding frame by the position determining portion and a fixing direction of the first holding frame by the fixing portion.

In a direction crossing a position determining direction of the first holding frame by the position determining portion and a fixing direction of the first holding frame by the fixing portion, may be a direction approximately parallel to the optical axis of the optical system.

The energizing force regulating portion may be a screw capable of advancing and withdrawing along a direction approximately parallel to the optical axis.

Two position determining portions may be provided along an outer periphery of the first holding frame, and these two position determining portions are respectively capable of advancing and withdrawing in a radial direction from the optical axis, and the directions of advancing and withdrawing are orthogonal to each other.

Two elastic bodies may be respectively provided corresponding to the position determining portions, at sides opposite the positioning determining portion and sandwiching therewith the optical axis, and the fixing portion is between the two elastic bodies, and is disposed at a side opposite the two position determining portions and respectively sandwiching therewith the optical axis.

According to the second aspect of the invention, there is provided an optical device comprising: a first holding frame which holds an optical system; a second holding frame which supports the first holding frame; a first elastic body having elasticity and provided between the first holding frame and the second holding frame when viewed from a direction which crosses an optical axis of the optical system; a first screw member which is screw-tightened in a direction which crosses the optical axis, and provided so as to sandwich, with the first elastic body, the first holding frame when viewed from a direction which crosses the optical axis; a second screw member which is screw-tightened in a direction which crosses the optical axis, and provided so as to sandwich, with the first screw member, the first holding frame when viewed from a direction which crosses the optical axis; and a second elastic body which applies an elastic force to the first holding frame, in a direction which crosses a screw-tightening direction of the first screw member and the screw-tightening direction of the second screw member.

The optical device may further comprises: a third screw member which regulates the elastic force of the second elastic body, and which is provided so as to sandwich, with the first holding frame, the second elastic body, in a direction which crosses the screw-tightening direction of the first screw member and the direction of screw-tightening the second screw member.

According to the third aspect of the invention, there is provided an optical instrument comprising the above optical device.

Further, the above constitution may be suitably improved, or at least one portion may be substituted with another constituent element.

According to the present invention, it is possible to provide an optical device and optical instrument which can provide excellent optical characteristics.

DETAILED DESCRIPTION OF THE PREFERRED EMBODIMENT

Below, an embodiment of the invention will be explained with reference to the drawings and the like.

Figure 1:
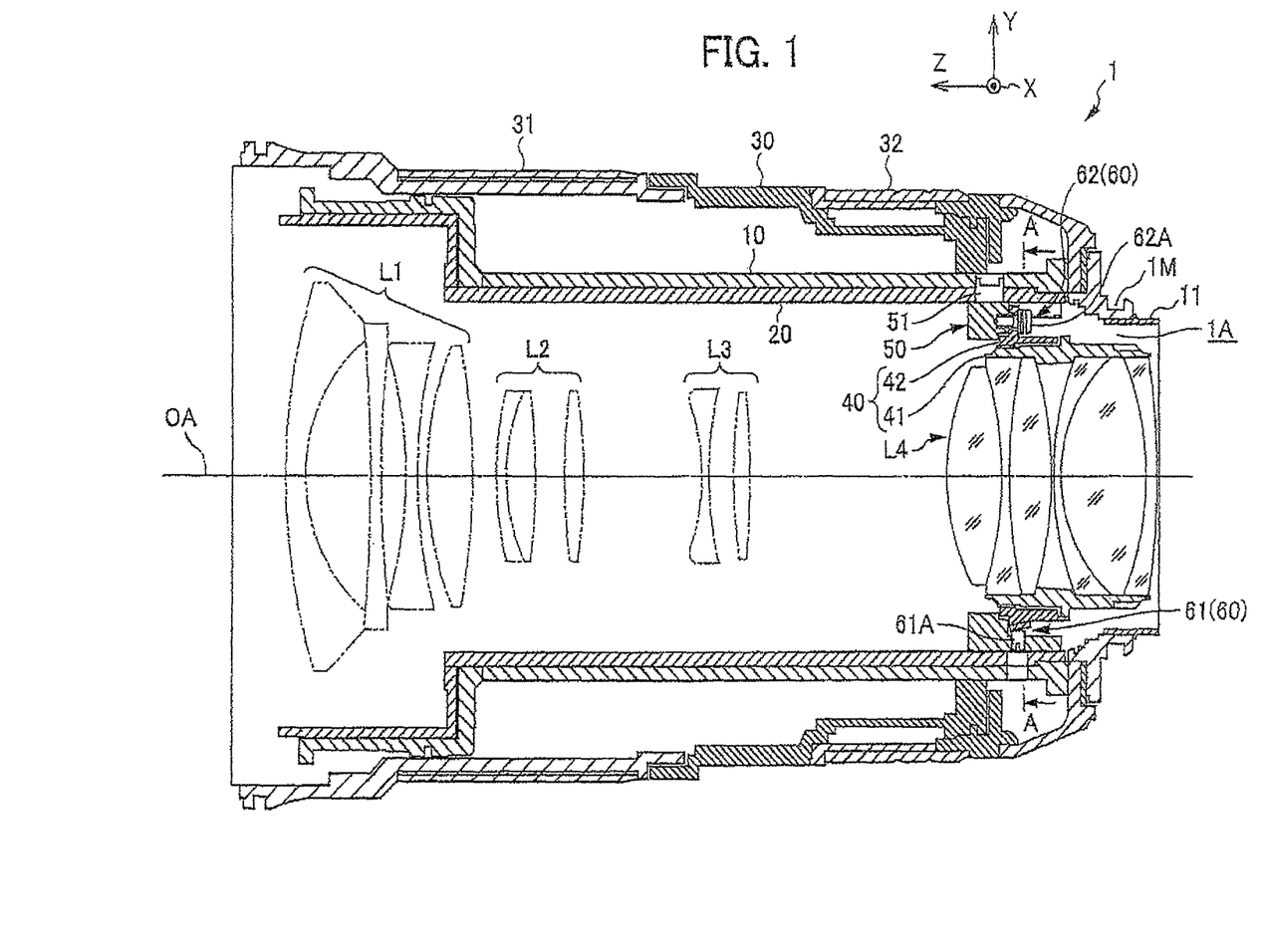
FIG. 1 is a longitudinal cross sectional drawing including the optical axis OA of the lens barrel 1 which is the first embodiment of the present invention.
Figure 2:
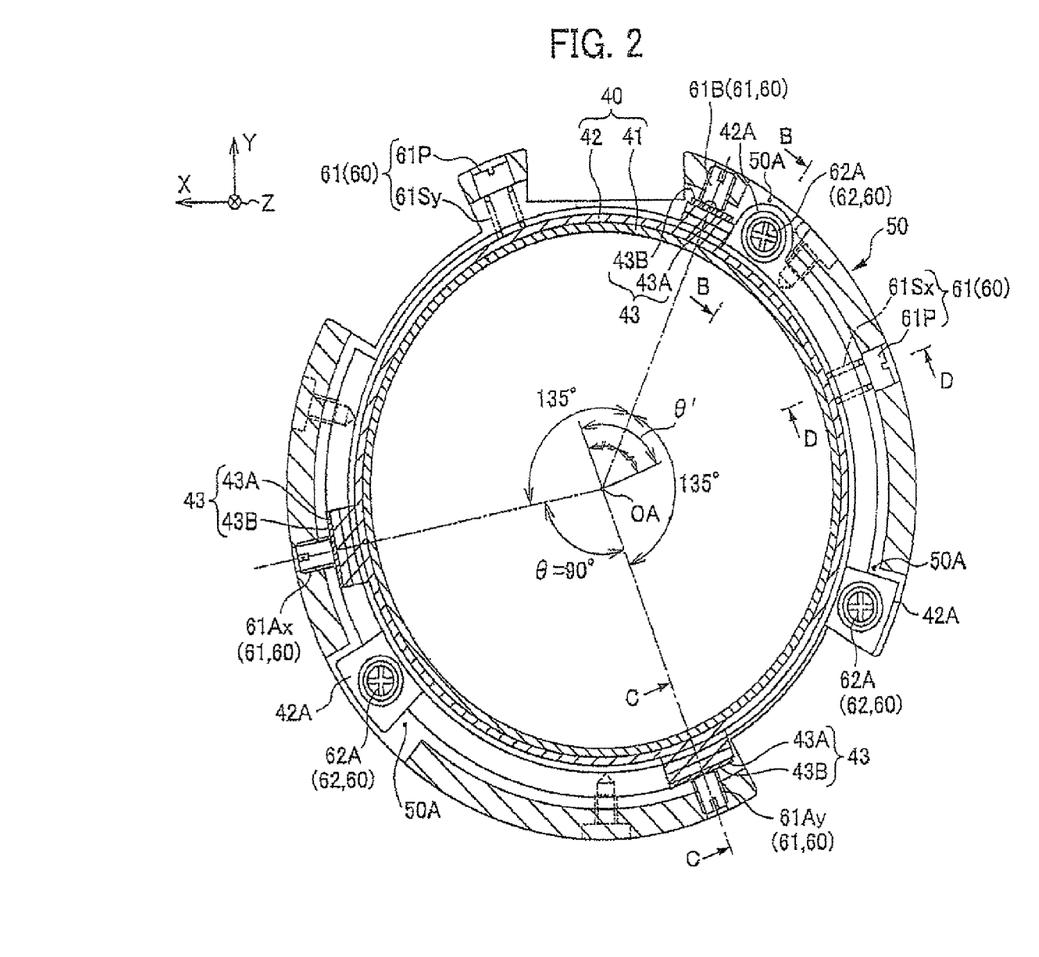
FIG. 2 is a lateral cross sectional drawing orthogonal to the optical axis OA of the lens barrel 1 corresponding to the A-A cross section of FIG. 1.
Figure 3:
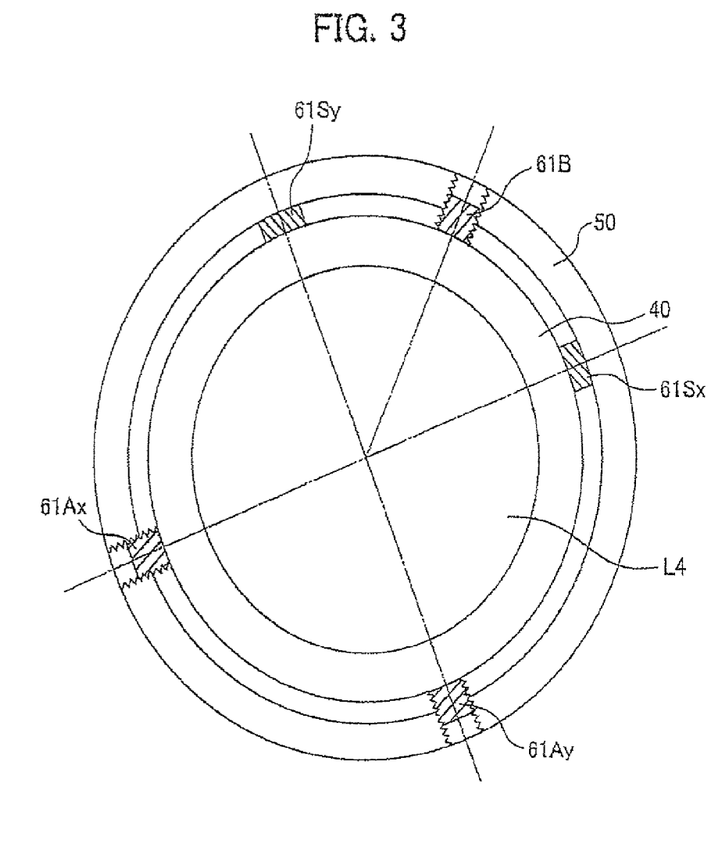
FIG. 3 is a simplified drawing of FIG. 2.
Figure 4:
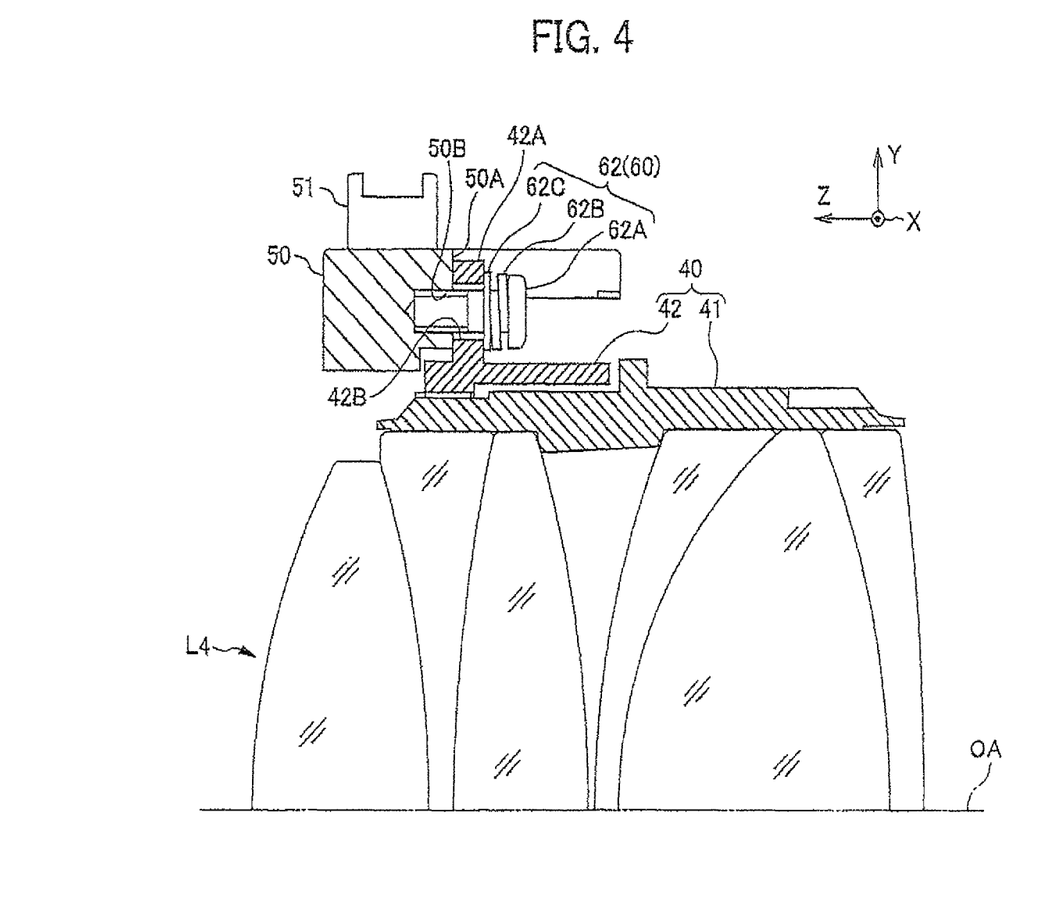
FIG. 4 is the B-B cross section of FIG. 2.
Figure 5:
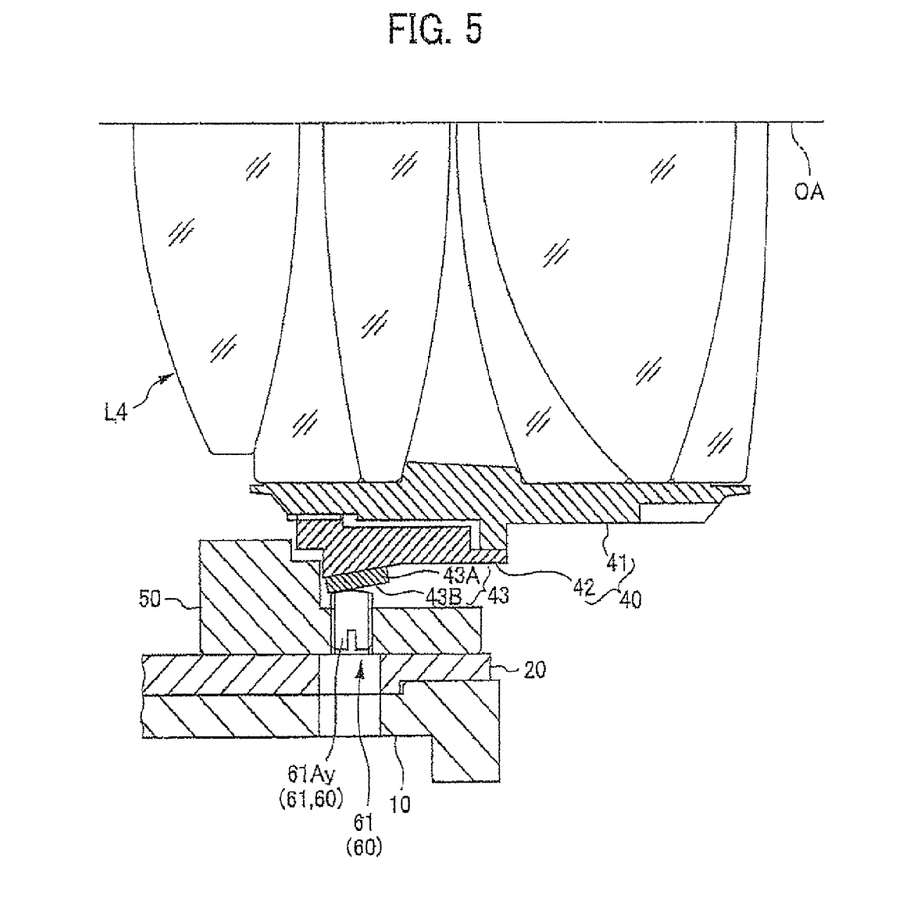
FIG. 5 is the C-C cross section of FIG. 2.
Figure 6:
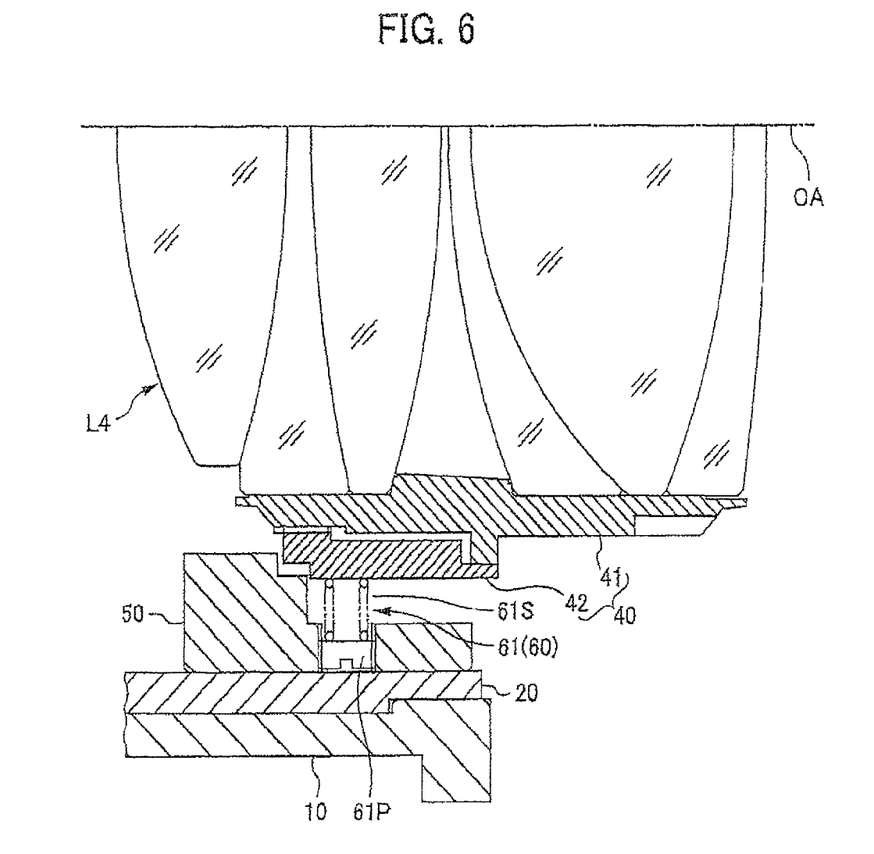
FIG. 6 is the D-D cross section of FIG. 2.

FIG. 1 is a longitudinal cross section including the optical axis OA of the lens barrel 1 which is the first embodiment of the present invention. FIG. 2 is a lateral cross sectional drawing orthogonal to the optical axis OA of the lens barrel 1 corresponding to the A-A cross section of FIG. 1. FIG. 3 is a simplified drawing of FIG. 2. FIG. 4 is the B-B cross section of FIG. 2, FIG. 5 is the C-C cross section of FIG. 2. FIG. 6 is the D-D cross section of FIG. 2.

Further, in each drawing, in order to facilitate explanations and understanding, an XYZ Cartesian coordinate system has been established. In this coordinate system, in the camera position in the case of photographing a horizontal image with the photographer holding the optical axis OA horizontal (below referred to as the correct position), the direction going towards the left side as seen from the photographer is the X plus direction. Further, the direction going upwards in the correct position is the Y plus direction. Furthermore, the direction towards the subject in the correct position is the Z plus direction. The Z plus direction going towards the subject in this Z direction is called the front face side, and the Z minus direction is called the rear face side.

As shown in FIG. 1, the lens barrel 1 is provided with the fixed tube 10, and the cam tube 20 disposed at the inner peripheral side of the fixed tube 10.

The outer cylinder 30 formed at the outer face of the lens barrel 1, the zoom operation ring 31, and the focus operation ring 32 are disposed at the outer peripheral side of the fixed tube 10.

Further, four lens units (the first lens unit L1, second lens unit L2, third lens unit L3, and fourth lens unit L4) are disposed at the inner portion of the cam tube 20.

The fixed tube 10 has an approximately cylindrical form, and at its base end portion (the end of the rear side), the mount ring 1M is fixed. The mount ring 1M can be detachably engaged with a mount ring of the body side provided at the camera body, not shown, and by engaging this mount 1M to the body mount ring, the lens barrel 1 is mounted to the camera body.

The cam tube 20 has an approximately cylindrical form, and concentrically mates with the inner periphery of the fixed tube 10, and is provided to be rotatable with respect to the fixed tube 10. The cam tube 20 is coupled via a coupling mechanism, not shown, with the zoom operation ring 31 and the focus operation ring 32, and rotates about the optical axis OA and also moves along the optical axis OA direction coupled with their rotation.

The zoom operation ring 31 is provided to be freely rotatable at the subject side of the outer peripheral face side of the outer tube 30. The focus operation ring 32 is provided to be freely rotatable at the image side of the outer peripheral face side of the outer tube 30.

The four lens units disposed at the inner portion of the cam tube 20 (the first lens unit L1, second lens unit L2, third lens unit L3, and fourth lens unit L4) while not shown in detail, are held by respective lens holding frames 40, and are provided to be moveable in the optical axis OA direction at the inner periphery of the cam tube 20 via the lens holding frame 40. Each lens unit L1 to L4 is coupled with the rotation of the zoom operation ring 31 and the focus operation ring 32, and moves forwards or backwards in a predetermined relationship along the optical axis OA.

Namely, respective cam pins provided projecting in the radial direction at the outer peripheral side at the lens holding frame 40 of each lens unit L1 to L4 pass through a cam groove formed at the cam tube 20, and mate with a rectilinear groove formed in the lens tube 10. The cam groove of the cam tube 20 changes its position in the peripheral direction, in a predetermined relationship with the optical axis OA direction; on the other hand, the rectilinear groove of the fixed tube 10 is formed parallel to the optical axis OA. In this way, each lens unit L1 to L4, coupled with the rotation of the cam tube 20, moves with a respective predetermined relationship in the optical axis direction.

Here, the fourth lens unit L4 is constituted so that its position in a direction orthogonal to the optical axis OA is adjustable. In this way, it is possible to maintain the optical performance by finally adjusting the deviation of the optical axis (optical axis adjustment) arising from the accumulation of measurement tolerances of the parts when assembling the lens.

Next, the supporting constitution including the optical axis adjustment structure of the fourth lens unit L4 will be explained in detail.

The fourth lens unit L4 is held by the lens holding frame 40, and is supported at the inner portion of the cam tube 20 via the coupling member 50 positioned at the outer peripheral side of this lens holding frame 40 (sandwiched with the can tube 20). The lens holding frame 40 is engaged with the coupling member 50 via the adjustable fixing mechanism 60 which allows position adjustment in a direction orthogonal to the optical axis OA.

The lens holding frame 40 is constituted of the lens chamber 41 which holds the lens unit L4, and the lens chamber holding frame 42 which holds the lens chamber 41 at the outer peripheral side.

The lens camber 41 has an outline form which is cylindrical, and at its inner portion it holds in a predetermined positional relationship a plurality of lenses constituting the lens unit L4. An outer peripheral thread is formed at the outer periphery of the front face side of the lens chamber 41.

The lens chamber holding frame 42 has a cylindrical shape, and a female thread which thread-engages with the outer peripheral thread of the lens chamber 41 is formed at its inner periphery. At the outer periphery of the lens chamber holding frame 42, a fixing protuberance 42A is provided protruding towards the radial direction outer side.

As shown in FIG. 4, the fixing protuberance 42A has a plate shape with a predetermined thickness with both faces orthogonal to the optical axis OA, and as shown in FIG. 2, three of them are provided at locations at predetermined angular intervals in the peripheral direction. The mounting holes 42B are formed to pass through the fixing protuberances 42A. The mounting holes 42B are formed parallel to the optical axis OA. Further, the diameter of the mounting holes 423 is set to the size of the outer diameter of the fixing screw 62A of the adjustable fixing mechanism 60 with the addition of a predetermined adjustment amount.

Then, the lens chamber holding frame 42 and the lens chamber 41 are united to constitute the lens holding frame 40 by thread-engaging to the inner peripheral female thread of the lens chamber holding frame 42 the lens chamber 41 by its outer peripheral thread.

The lens holding frame 40 is positioned at the rear face side of the coupling member 50, and is fixed to the coupling member 50 by the fixing screw 62A passing through the fixing protuberance 42A of the lens chamber holding frame 42 from the rear face side towards the front face side. The fixing screw 62A constitutes the fixing portion 62 of the later described adjustable fixing mechanism 60.

The coupling member 50 has a basic form which is a cylinder with a predetermined thickness, but in connection with its mating with other constituent members, it is notched to be thinner over a part of its angular range, and further, is widened over part of its angular range to protrude by a predetermined amount at its rear face side.

As shown in FIG. 4, at the outer periphery of the coupling member 50, the cam pin 51 having a cylindrical shape is provided to protrude towards the radial direction outer peripheral side of the coupling member 50. The cam pin 51 is mated so as to be slidably moveable with a cam groove, not shown in the drawing, formed at the cam tube 20, and the tip, which protrudes further, is mated so as to be slidably moveable with a rectilinear groove, not shown in the drawings, formed at the fixed tube 10. In this way, the coupling member 50 is movably driven in the optical axis OA direction according to a change in position of the cam groove, by the rotation of the cam tube 20, as provided by the moving direction of the rectilinear groove of the fixed tube 10.

At the positions of the coupling members 50 corresponding to the fixing protuberances 42A of the lens chamber holding frame 42, respective fixing surfaces 50A are formed orthogonal to the optical axis OA, and at each fixing surface 50A a respective fixing female thread 50B is provided. The fixing female thread 50B is formed orthogonal to the fixing surface 50A (namely, parallel to the optical axis OA).

As shown in FIGS. 2 and 3, the adjustable fixing mechanism 60 which engages the lens holding frame 40 with the coupling member 50 so as to have an adjustable position, is constituted of the adjustment portion 61 and the fixing portion 62 provided at the coupling member 50.

First, the adjustment portion 61 will be explained.

The adjustment portion 61 is constituted of the two adjustment screws 61A (61Ax, 61Ay) disposed so as to pass through and thread-engage the coupling member 50, the one fixing screw 61B, and the two pressing springs 61S (61Sx and 61Sy).

As shown in FIGS. 5 and 3, the adjustment screws 61Ax and 61Ay and the fixing screw 61B are slotted set screws, and are disposed to pass through the coupling member in the radial direction.

As shown in FIGS. 2 and 3, the positioning of the two adjustment screws 61Ax and 61Ay in the peripheral direction is set to a 90° interval.

Accordingly, one adjustment screw 61Ax is disposed in the vicinity of the X axis of the plus side in the drawing, while the other adjustment screw 61Ay is disposed in the vicinity of the Y axis of the minus side in the drawing.

Further, the fixing screw 61B is disposed in an opposite angular domain θ' opposite to the angle θ (=90°) formed by the center lines of the two adjustment screws 61Ax and 61Ay, with which it sandwiches the optical axis OA. In the present embodiment, the fixing screw 61B is provided at approximately the center of the corresponding angular range θ' (namely, positioned 135° away in the peripheral direction from either of the adjustment screws 61A).

The adjustment screws 61A and the fixing screw 61B advance and withdraw in the radial direction by the rotational operation of an adjustment tool such as a screwdriver or the like from the outer peripheral side of the coupling member 50, and their tips can be made to protrude from the inner peripheral face of the coupling member 50. The tips of the adjustment screws 61A and the fixing screw 61B which protrude from the inner peripheral face of the coupling member 50 press the lens holding frame 40 (lens chamber holding frame 42).

Further, adjustment holes where an adjustment tool can be inserted from the outer peripheral side are formed as openings at the positions corresponding to the positioning of the adjustment screws 61A and the fixing screw 61B at the cam tube 20 and the fixed tube 10 as well as at the members positioned at their outer peripheral side (outer tube 30, zoom operation ring 31, focus operation ring 32 and the like). The position in the optical axis OA direction of the adjustment holes is determined by where the adjustment of the lens holding frame 40, which moves in the optical axis OA direction, is carried out, but if the adjustment holes are set at the position of the zoom operation ring 31 or the focus operation ring 32 where rubber rings or the like are mounted at the external cladding, by mounting the rubber ring or the like, it is possible to conceal the adjustment hole, which is more preferable.

In this way, by forming as an opening an adjustment hole where an adjustment tool can be inserted from the outside, it is possible to carry out an optical axis adjustment operation at the final step of the lens assembly process of the lens barrel 1, and the manufacturing steps can be reduced.

On the other hand, at the lens chamber holding frame 42 of the lens holding frame 40, at a position corresponding to the adjustment screws 61A and the fixing screw 61B of the coupling member 50, the pressure receiving portion 43 is formed. The adjustment screws 61A and the fixing screw 61B which protrude at the inner peripheral side of the coupling member 50 press this pressure receiving portion 43.

As shown in FIG. 5, the pressure receiving portion 43 is constituted of the inclined face 43A in a direction increasing the diameter of the front face side, formed on the lens chamber holding frame 42, and the contact plate 43B disposed at the outer peripheral side of this inclined face 43A.

The contact plate 43B is formed of a material which is hard and has a higher abrasion resistance than the coupling member 50, and is a plate having a predetermined thickness.

In this way, the tips of the adjustment screw 61A and the fixing screw 61B press the inclined face 43A via the contact plate 43B (namely the lens chamber frame 42=the lens holding frame 40).

The pressing spring 61S is a coil spring having a predetermined diameter and predetermined length, and as shown in FIG. 6, it passes through the coupling member 50 in the radial direction, and is installed in the coupling member 50 with its position in the radial direction being prescribed by the plug 61P. The pressing spring 61S protrudes at the inner peripheral side of the coupling member 50, and press-energizes the outer peripheral face corresponding to the lens chamber holding frame 42 of the lens holding frame 40 by its elastic return force.

The position in the peripheral direction of the pressing spring 61S, as shown in FIG. 2, is set at a position approximately opposite (a position at approximately 180° in the peripheral direction) of the adjustment screw 61A sandwiching the optical axis OA. Accordingly, one of the pressing springs 61Sx is disposed in the vicinity of the X axis at the minus side in FIG. 2, and the other pressing spring 61Sy is disposed in the vicinity of the Y axis in the plus side in the figure, In this way, the pressing spring 61Sx press-energizes the lens holding frame 40 towards the adjustment screw 61Ax, and the pressing spring 61Sy press-energizes the lens holding frame 40 towards the adjustment screw 61Ay. As a result, the pressing springs 61S can efficiently press-energize the lens holding frame 40 to the adjustment screws 61A, and further, it is possible to smoothly change the position when pressing the lens holding frame 40 by the adjustment screws 61A.

Accordingly, the adjustment screws 61A are provided so as to sandwich, with the pressing spring 61S, the lens holding chamber 40. Here, "provided so as to sandwich" is not limited to opposing the pressing springs 61S to sandwich the lens holding frame 40. The adjustment screw 61A may, for example, be provided at an arbitrary position which is capable of determining the position towards the pressing spring 61S of the lens holding frame 40 so that an elastic return force is generated at the pressing spring 61S. Thus, the pressing springs 61S do not have to be positioned accurately with respect to the adjustment screws 61A to sandwich the optical axis OA (on an extension line of a line connecting the adjustment screws 61A and the optical axis OA), and it does not matter if there is some deviation.

Further, the fixing portion 61B is provided so as to sandwich, with the lens holding frame 40, the position determining portion 61A. Here, "provided so as to sandwich" is not limited to opposing the position determining portion 61A to sandwich the lens holding frame 40. The fixing portion 61B may, for example, be provided at an arbitrary position which is capable of fixing the lens holding frame 40 towards the position determining portion 61A such that the lens holding frame 40 is fixed.

In the initial state of the adjustment portion 61 constituted as described above, the lens holding frame 40 is held at an inner portion of the coupling member 50 by the energizing force of the pressing spring 61S In this state, by screw-advancing the adjustment screw 61A to make it protrude at the inner peripheral side of the coupling member 50, it is possible to movably operate the lens holding frame 40 against the energizing force of the pressing spring 61S. Because two adjustment screws 61A are provided at a 90° interval (the adjustment screws 61Ax, 61Ay), by making appropriate respective adjustments, it is possible to easily move the lens holding frame 40 to an arbitrary position within a plane orthogonal to the optical axis OA (the X-Y plane). In this way, in the present constitution, by operating one adjustment screw 61A the lens holding frame 40 moves in response to the operation amount in only one direction, which is very good in terms of workability.

Moreover, in FIG. 2, the X and Y axes in the figure and the axes of the adjustment screws 61Ax and 61Ay do not coincide. However, this makes no difference in that it is possible to move to an arbitrary position within the X-Y plane by moving in two orthogonal directions. The adjustment operation can be easily carried out by supporting the lens barrel such that the axes of the adjustment screws 61Ax and 61Ay coincide with the X axis and Y axis of the adjustment device or tool.

In this way, it is possible to carry out optical axis adjustment to make the optical axis of the fourth lens unit 4L coincide with the optical axis OA of the lens barrel 1 by moving within the X-Y plane the fourth lens unit 4L held by the lens holding frame 40.

This movement of the lens holding frame 40 when carrying out this optical axis adjustment can be carried out stably and without adding backlash to the lens holding frame 40 in the direction orthogonal to the optical axis OA, because it is carried out against the energizing force of the pressing spring 61S disposed forward of the pressing operation direction by the adjustment screw 61A, After finishing the position adjustment, the fixing screw 61B is tightened so that the lens holding frame 40 is pressed into the adjustment screws 61Ax and 61Ay. In this way, it is possible to fix to immobilize the lens holding frame 40 within a plane orthogonal to the optical axis OA.

Here, when the tips of the adjustment screws 61A and the fixing screw 61B press the lens holding frame 40, the tips of the adjustment screws 61A and the fixing screw 61B contact the pressure receiving portion 43 of the lens chamber holding frame 42. The pressure receiving portion 43 is the inclined face 43 in a direction in which the front face side diameter increases. Because of this, the force components of the pressing force in the radial direction by the adjusting screws 61A and the fixing screw 61B operate in a direction to energize the lens holding frame 40 towards the side of the coupling member 50 positioned at its front face side (closely contacting the fixing protuberance 42A of the lens chamber holding frame 42 to the fixing surface 50A). In this way, it is possible to suppress backlash in the optical axis OA direction of the lens holding frame 40 (collapse with respect to the coupling member 50) during the pressing action. Further, between the inclined face 43A and the tips of the adjustment screws 61A as well as fixing screw 61B, there is provided the contact plate 43B which is formed of a material which is hard and has high abrasion resistance. In this way, it is possible to prevent degradation of precision and slackness arising from scraping of the concerned portion (inclined portion 43A) of the lens chamber holding frame 42 by the tips of the adjustment screws 61A and the fixing screw 61B.

Next, the fixing portion 62 shown in FIG. 4 is explained.

The fixing portion 62 as described above, is constituted of the fixing screw 62A which fixes the lens holding frame 40 to the coupling member 50. The fixing screw 62A is provided such that the fixing protuberances 42A of the lens holding frame 40 are respectively fixed to the coupling member 50. Accordingly, the fixing screws 62A are provided at three locations in the peripheral direction. Here, the positions in the peripheral direction of the fixing protuberances 42A of the lens holding frame 40 (namely the position in the peripheral direction of the fixing screw 62A) are preferably set at equal intervals in the peripheral direction (120° intervals). Further, each fixing protuberance 42A (fixing screw 62A) may be disposed between the adjustment screws 61A of the adjustment portion 61 and the fixing screw 61B in order to stably fix the lens holding frame 40 to the coupling member 50.

The fixing screw 62A is a screw having a head with a large diameter such as a pan head machine screw. The fixing screw 62A is inserted from the rear face side at the mounting hole 42B of the fixing protuberance 42A of the lens holding frame 40 and passes through the fixing protuberance 42A, and thread-engages with the fixing female screw 50B of the coupling member 50. The center axis of the fixing screw 62A is parallel to the optical axis OA.

The spring washer 62B and the flat washer 62C are inserted between the head of the fixing screw 62A and the fixing protuberance 42A.

The spring washer 623 has a form of a torus divided by a slit and is twisted in the direction of its center axis, and is formed to give rise to an elastic return force when made to compressively deform in its center axis direction so as to return to its original toroidal shape.

The flat washer 62C is a toroidal shape of a predetermined thickness, and its outer diameter is larger than the spring washer 62B. The flat washer 62C is disposed between the spring washer 623 and the fixing protuberance 42A. This flat washer 62C is disposed so as to eliminate any difficulty in moving when tightening the fixing screw 62A due to the direct contact of the spring washer 62B to the fixing protuberance 42A, and to prevent the generation of abrasion or the like.

Thus, the fixing portion 62 fixes the lens holding frame 40 to the coupling member 50 by closely contacting the fixing protuberance 42A to the fixing surface 50A of the coupling member 50 by the tightening of the fixing screw 62A to the fixing female screw 50B of the coupling member 50. In this state, the spring washer 62B is deformed to be flat, and acts to prevent slack of the fixing screw 62A by its elastic return force.

Further, even when the fixing screw 62A is loosened, if the spring washer 62B is in a deformed state, the spring washer 62B will press-energize the fixing protuberance 42A to the fixing surface 50A of the coupling member 50 by its elastic return force. Because of this, it is possible to prevent collapse of the lens holding frame 40 with respect to the coupling member 50. Further, even if the previously mentioned adjustment portion 61 is in a non-functioning state, movement of the lens holding frame 40 with respect to the coupling member 50 can be controlled by the friction between the fixing protuberance 42A and the fixing surface 50A. When a force greater than this frictional force operates, the lens holding frame 40 moves with respect to the coupling member 50. In this case, the range of possible movement of the lens holding frame 40 with respect to the coupling member 50 is the range permitted by the movement of the fixing screw 62A in the mounting hole 42B of the fixing protuberance 42A.

Further, a lubricant such as grease or the like is applied between the fixing protuberance 42A and the fixing surface 50A in order to make possible smooth movement of the lens holding frame 40, Further, the positioning of the fixing screw 62A in the radial direction is set such that it is operationally possible to tighten it from the rear face side of the lens barrel 1. Accordingly, as shown in FIG. 1, at the end portion of the rear face side of the lens barrel 1, the mount ring 1M is disposed, and further, a cover ring 11 is mounted at its inner periphery so that the inner portion cannot be easily seen. This cover ring 11 and the lens holding frame 40, as shown in FIG. 1, are stacked in the radial direction in the state where the lens holding frame 40 is positioned at the rear face side, but a clearance 1A having a toroidal shape is formed between the inner peripheral face of the cover ring 11 and the outer peripheral face of the lens holding frame 40. The positioning of this clearance 1A and the fixing screw 62A approximately coincide, and thus it is possible to rotationally operate the fixing screw 62A by inserting an adjustment tool such as a screwdriver into the clearance 1A from the rear face side of the lens barrel 1. In this way, it is possible to carry out an optical axis adjustment operation (and fixing operation) in the final step of the lens assembly process in the lens barrel 1, and the operation processes can be reduced.

According to the adjustable fixing mechanism 60 constituted as described above, it is possible to carry out optical axis adjustment by a moving operation of the lens holding frame 40 (fourth lens unit) in a direction orthogonal to the optical axis OA, and further, it is possible to firmly fix it to the coupling member 50.

The optical axis adjustment, by thread-adjusting the adjustment screw 61A of the adjustment portion 61, moves the lens holding frame 40 within the X-Y plane orthogonal to the optical axis OA, and makes the optical axis of the fourth lens unit L4 held by the lens holding frame 40 coincide with the optical axis OA of the lens barrel 1.

When making this optical axis adjustment, the fixing screw 61B of the adjustment portion 61 is in a state such that it does not protrude to the inner peripheral side of the coupling member 50, so that it does not hinder the movement of the lens holding frame 40. Further, the fixing screw 62A of the fixing portion 62 is loosened within the scope of the deformed state of the spring washer 62B. In this way, the fixing portion 62 is prevented from collapsing and backlash with respect to the coupling member 50 of the lens holding frame 40, and optical axis adjustment can be carried out with high precision.

After the completion of the optical axis adjustment, the fixing screw 61B of the adjustment portion 61 is tightened, and the lens holding frame 40 is fixed to the coupling member 50 in the directions orthogonal to the optical axis OA. Next, the fixing screw 62A of the fixing portion 62 is tightened, and the lens holding frame 40 is fixed to the coupling member 50 in the direction parallel to the optical axis OA. Namely, in both the directions orthogonal to the optical axis OA and the direction parallel to the optical axis OA, the lens holding frame 40 is fixed to the coupling member 50. In this way, it is possible to firmly fix the lens holding frame 40 to the coupling member 50, and it is possible to suppress degradation of the precision arising from the actions of vibrations and shocks and dropping of the lens barrel 1.

Here, the optical axis adjustment and fixing are carried out with respect to the lens chamber holding frame 42 of the lens holding frame 40. Because of this, after the optical axis adjustment, even if the lens chamber 41 is mounted and dismounted with respect to the lens chamber holding frame 42, the effect of the optical axis adjustment is maintained. Accordingly, after the completion of the optical axis adjustment, if a problem such as the adhesion of dust to the fourth lens unit L4 is discovered, it can be unscrewed and removed from the lens chamber holding frame 42 and the lens chamber is detached, and reattached after cleaning, and the precision of the optical axis adjustment is preserved. In this way, repeating the optical axis adjustment is unnecessary, and the assembly operation can be carried out very rationally.

The above described embodiment has the following effects, (1) The lens holding frame 40 disposed at the inner peripheral side of the coupling member 50 is provided with the adjustment portion 61 providing the adjustment screw 61A which movably operates in a direction orthogonal to the optical axis OA in opposition to the energizing force of the pressing spring 61S and in addition determines the position, and the fixing screw 61B which presses and fixes the lens holding frame 40 to the adjustment screw 61A; and the fixing portion 62 which fixes the lens holding frame 40 to the coupling member 50 by the fixing screw 62A parallel to the optical axis OA. In this way, after the optical axis adjustment, it is possible to fix the lens holding frame 40 to the coupling member 50 in a direction orthogonal to the optical axis OA by the fixing screw 61 of the adjustment portion 61, and to fix the lens holding frame 40 to the coupling member 50 in a direction parallel to the optical axis OA by the fixing screw 62A of the fixing portion 62. Because of this, it is possible to firmly fix the lens holding frame 40 to the coupling member 50 such that it does not move due to dropping or vibrating and shocking of the lens barrel 1, and it is possible to suppress degradation of the precision.

Further, the spring washer 62B inserted between the fixing screw 61B of the fixing portion 62 and the lens holding frame 40 press-energizes the lens holding frame 40 to the coupling member 50 during the optical axis adjustment by its elastic return force. Because of this, it is possible to suppress the collapse of the lens holding frame 40 with respect to the coupling member 50, and high precision optical axis adjustment becomes possible.

(2) The spring washer 62B is inserted between the head portion of the fixing screw 62A of the fixing portion 62 and the fixing protuberance 42A of the lens holding frame 40, and further, the flat washer 62C is disposed between the spring washer 62B and the fixing protuberance 42A. Because of this, it is possible to prevent difficulty in moving when tightening the fixing screw 62A and to prevent abrasion due to contact of the spring washer 62B with the fixing protuberance 42A.

(3) Two adjustment screws 61Ax and 61Ay of the adjustment portion 61 are disposed at a 90° interval. Because of this, by appropriate respective adjustments, it is possible to easily move the lens holding frame 40 to an arbitrary position within a plane orthogonal to the optical axis OA, and the workability is very good.

(4) The two sets of pressing springs 61Sx and 61Sy of the adjustment portion 61 respectively press-energize the lens holding frame 40 towards the adjustment screws 61Ax and 61Ay. Because of this, the pressing springs 61S can efficiently press-energize the lens holding frame 40 to the adjustment screws 61A, and further, it is possible to smoothly change the position when the lens holding frame 40 is pressed by the adjustment spring 61A.

(5) By respectively disposing the three fixing screws 61B of the fixing portion 62 between the adjustment screws 61A and the fixing screw 61B of the adjustment portion 61, it is possible to stably fix the lens holding frame 40 to the coupling member 50.

(6) The fixing portion 62 fixes the lens holding frame 40 to the coupling member 50 by closely contacting the fixing protuberance 42A to the fixing surface 50A of the coupling member 50 by tightening the fixing screw 62A to the fixing female screw 50B of the coupling member 50. Further, if the fixing screw 62A is loosened within the range of the deformed state of the spring washer 62B, the lens holding frame 40 can move with respect to the coupling member 50 in a state where collapse is prevented by the press-energizing force of the spring washer 62B. Because of this, it is possible to carry out optical axis adjustment smoothly and with high precision by moving the lens holding frame 40 with respect to the coupling member 50.

(7) At the end portion of the rear face side of the lens barrel 1, a toroidal clearance 1A is formed between the inner peripheral face of the cover ring 11 and the outer peripheral face of the lens holding frame 40, and it is possible to rotationally operate the fixing screw 62A of the fixing portion 62 by inserting an adjustment tool such as a screwdriver or the like. In this way, it is possible to carry out an optical adjustment operation (and fixing operation) in the final stage of the lens assembly procedure of the lens barrel 1, and the number of operations can be reduced.

(8) The lens holding frame 40 is constituted such that the lens chamber 41 which holds the fourth lens unit L4 is attachable and detachable by screws with respect to the lens chamber holding frame 42 whose position is adjusted and fixed with respect to the coupling member 50 by the adjustable fixing mechanism 60. In this way, after the optical axis adjustment has once been completed, in the case that a problem such as the attachment of dust or the like to the fourth lens unit L4, or the like, is discovered, the lens chamber 41 can be unscrewed and detached from the lens chamber holding frame 42, and even when remounted after the cleaning, the precision of the optical axis adjustment is preserved. Because of this, it is not necessary to carry out another optical axis adjustment, and it is possible to carry out very rational manufacturing.

Modifications

Without being limited to the above explained embodiment, many variations and modifications are possible such as those shown below, and these are also within the scope of the present invention.

(1) The present embodiment is an example where there is one fixing screw 61B of the adjustment portion 61. However, without being limited to this, there may be a plurality of two or more fixing screws 61B.

(2) Further, in the present embodiment, there are three fixing screws 62A of the fixing portion 62. However, without being limited to this, there may be four or more fixing screws.

(3) In the fixing portion 62 of the present embodiment, the spring washer 62B is constituted so as to press-energize the lens holding frame 40 to the coupling member 50. However, the member which carries out the press-energizing is not limited to a spring washer, and another spring member having another constitution may be used.

(4) The above embodiment is an example of a constitution where the optical axis adjustment is carried out with respect to the lens holding frame 40 which holds the fourth lens unit L4, but of course, the present optical axis adjustment constitution may also be applied to other lens units.

(5) The optical system which is adjusted is preferably that which is closest to the image side, however, without being limited to this, it may also be another optical system. Further, the adjusted optical system may be a single lens, or may be a lens unit.

(6) In the present embodiment, an explanation was given for a lens barrel as an optical device, however, this is not a limitation, and for example, it may also be a still camera, video camera, a lens barrel, a mobile telephone, a telescope or the like.

Further, the embodiments and modifications may also be used in appropriate combinations, but specific explanations thereof are omitted. Further, the present invention is not limited by the above-explained embodiment.

What is claimed is:

1. An optical device comprising:
   a first holding frame which holds an optical system;
   a second holding frame which supports the first holding frame;
   an elastic body having elasticity, and which is provided between the first holding frame and the second holding frame when viewed from a first direction crossing an optical axis of the optical system;
   a position determining portion which is provided so as to sandwich, with the elastic body, the first holding frame when viewed from the first direction, and which is capable of determining a position of the first holding frame towards the elastic body so as to give rise to an elastic force at the elastic body;
   a fixing portion which is provided so as to sandwich, with the position determining portion, the first holding frame when viewed from the first direction, and which is capable of fixing the first holding frame to the position determining portion so as to fix the first holding frame; and
   an energizing member which energizes the first holding frame towards the second holding frame in a position determining direction of the first holding frame by the position determining portion and a second direction crossing a fixing direction of the first holding frame by the fixing portion; and
   a pressure receiving portion provided respectively in (i) a portion at which the position determining portion abuts with the first holding frame, and (ii) a portion at which the fixing portion abuts with the first holding frame, the pressure receiving portion having an inclined surface that is inclined relative to the second direction and having a larger diameter on a second holding frame side than a first holding frame side.

2. The optical device according to claim 1, further comprising:
   an energizing force regulating portion which regulates an energizing force of the energizing member, provided so as to sandwich, with the first holding frame, the energizing member, in a direction crossing a position determining direction of the first holding frame by the position determining portion and a fixing direction of the first holding frame by the fixing portion.

3. The optical device according to claim 2, wherein:
the direction crossing the position determining direction of the first holding frame by the position determining portion and the fixing direction of the first holding frame by the fixing portion is approximately parallel to the optical axis of the optical system.

4. The optical device according to claim 3, wherein:
the energizing force regulating portion is a screw capable of advancing and withdrawing along a direction approximately parallel to the optical axis.

5. The optical device according to claim 1, wherein:
two position determining portions are provided along an outer periphery of the first holding frame, and these two position determining portions are respectively capable of advancing and withdrawing in a radial direction from the optical axis, and the directions of advancing and withdrawing are orthogonal to each other.

6. The optical device according to claim 5, wherein:
two elastic bodies are respectively provided corresponding to the position determining portions, at sides opposite the positioning determining portion and sandwiching therewith the optical axis, and the fixing portion is between the two elastic bodies, and is disposed at a side opposite the two position determining portions and respectively sandwiching therewith the optical axis.

7. An optical device comprising:
a first holding frame which holds an optical system;
a second holding frame which supports the first holding frame;
a first elastic body having elasticity, and provided between the first holding frame and the second holding frame when viewed from a first direction crossing an optical axis of the optical system;
a first screw member which is screw-tightened in the first direction, and provided so as to sandwich, with the first elastic body, the first holding frame when viewed from the first direction;
a second screw member which is screw-tightened in a second direction crossing the optical axis, and provided so as to sandwich, with the first screw member, the first holding frame when viewed from the second direction; and
a second elastic body which applies an elastic force to the first holding frame towards the second holding frame in a direction which crosses the first direction and the second direction; and
a pressure receiving portion provided respectively in (i) a portion at which the first screw member abuts with the first holding frame, and (ii) a portion at which the second screw member abuts with the first holding frame, the pressure receiving portion having an inclined surface that is inclined relative to the second direction and having a larger diameter on a second holding frame side than a first holding frame side.

8. The optical device according to claim 7, further comprising:
a third screw member which regulates the elastic force of the second elastic body, and which is provided so as to sandwich, with the first holding frame, the second elastic body, in a direction which crosses the screw-tightening direction of the first screw member and the direction of screw-tightening the second screw member.

9. An optical instrument comprising the optical device according to claim 1.

* * * * *